US012665759B2

(12) United States Patent
Wang et al.

(10) Patent No.: US 12,665,759 B2
(45) Date of Patent: Jun. 23, 2026

(54) SECURE MODEL AGGREGATION METHOD AND APPARATUS

(71) Applicant: HUAWEI TECHNOLOGIES CO., LTD., Shenzhen (CN)

(72) Inventors: Yang Wang, Shenzhen (CN); Xueqiang Yan, Shanghai (CN); Mingyu Zhao, Shanghai (CN); Shaoyun Wu, Shanghai (CN); Weijun Xing, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 18/937,243

(22) Filed: Nov. 5, 2024

(65) Prior Publication Data

US 2025/0070971 A1 Feb. 27, 2025

Related U.S. Application Data

(63) Continuation of application No. PCT/CN2023/089346, filed on Apr. 19, 2023.

(30) Foreign Application Priority Data

May 6, 2022 (CN) .......................... 202210486662.9

(51) Int. Cl.
*H04L 9/14* (2006.01)
*H04L 9/08* (2006.01)

(52) U.S. Cl.
CPC .............. *H04L 9/14* (2013.01); *H04L 9/0869* (2013.01)

(58) Field of Classification Search
CPC ..... H04L 9/14; H04L 9/0869; H04L 2209/46; H04L 9/008; H04L 9/0841; H04L 9/085; H04L 63/20; H04L 41/28; G06F 21/6245
See application file for complete search history.

(56) References Cited

U.S. PATENT DOCUMENTS 11,139,951 B2 * 10/2021 Zheng ................... H04L 9/3239
11,582,042 B2 * 2/2023 Beckmann ............ H04L 9/3239
(Continued)

FOREIGN PATENT DOCUMENTS

CN 112632620 A * 4/2021 ........... G06F 18/253

OTHER PUBLICATIONS

Mandal Kalikinkar et. al, Nike-based Fast Privacy-preserving High-dimentional Data Aggregation for Mobile Devices, Nov. 11, 2019 (Year: 2019).*
(Continued)

*Primary Examiner* — Joseph P Hirl
*Assistant Examiner* — Aayush Aryal
(74) *Attorney, Agent, or Firm* — Maier & Maier, PLLC

(57) ABSTRACT

A method includes: receiving M scrambled models from M online service nodes; receiving descrambling secrets from T online service nodes, where a descrambling secret of any online service node is determined based on M first shared keys of the online service node corresponding to the M online service nodes and N–M second shared keys of the online service node corresponding to N–M offline service nodes; and determining an aggregated model, where disturbance vectors of the M scrambled models are determined based on the descrambling secrets from the at least T online service nodes, at least N–T+1 first subsecrets determined by each service node based on N first shared keys and a first disturbance item corresponding to the service node, and at least N–T+1 second subsecrets determined by the service node based on N second shared keys and a second disturbance item corresponding to the service node.

20 Claims, 5 Drawing Sheets

Central node

(56) References Cited

U.S. PATENT DOCUMENTS

| | | | | | |
|---|---|---|---|---|---|
| 11,829,502 | B2 * | 11/2023 | Kuzin | .................. | H04L 9/3213 |
| 2022/0156614 | A1 * | 5/2022 | Dalli | ........................ | G06N 5/01 |
| 2022/0172050 | A1 * | 6/2022 | Dalli | .................. | G06N 3/0495 |
| 2022/0345484 | A1 * | 10/2022 | Drozd | ..................... | H04W 4/40 |
| 2023/0401439 | A1 | 12/2023 | Wang et al. | | |
| 2024/0323826 | A1 * | 9/2024 | Karapantelakis | ..... | H04W 48/18 |

OTHER PUBLICATIONS

Ziyao Liu et. al, Privacy-Preserving Aggregation in Federated Learning: A Survey, Aug. 2015 (Year: 2015).*

Liu et al., "Privacy-Preserving Aggregation in Federated Learning: A Survey", arXiv:2203.17005v1 [cs.CR], Journal of Latex Class Files, Aug. 2015, vol. 14, No. 8, 20 pages.

Mandal et al., "Nike-Based Fast Privacy-Peserving High-Dimensional Data Aggregation for Mobile Devices", URL: https://cacr.uwaterloo.ca/techreports/2018/cacr2018-10.pdf, Oct. 1, 2018, 22 pages.

* cited by examiner

SECURE MODEL AGGREGATION METHOD AND APPARATUS

CROSS-REFERENCE TO RELATED APPLICATIONS

This application is a continuation of International Application No. PCT/CN2023/089346, filed on Apr. 19, 2023, which claims priority to Chinese Patent Application No. 202210486662.9, filed on May 6, 2022. The disclosures of the aforementioned applications are hereby incorporated by reference in their entireties.

TECHNICAL FIELD

Embodiments relate to the field of network security technologies and to a secure model aggregation method and apparatus.

BACKGROUND

A federated learning (FL) system is a model training system oriented to a plurality of service nodes. When each service node participates in training, training data is stored locally and is not sent to another service node or a central node. The central node integrates submodels sent by service nodes or update data of the submodels that is sent by the service nodes, to finally complete training of an aggregated model. When the service nodes perform local submodel training, due to a difference in computing capabilities between the service nodes, the service nodes have different computing completion time. Although federated learning can ensure that original training data of each service node is not uploaded, a semi-honest or malicious central node may deduce related information of the original training data from a submodel or update data of the submodel that is sent by the service node. Therefore, a privacy protection problem is not resolved.

Currently, to protect privacy of the service node, when model aggregation is performed based on federated learning, a method is to use a secret sharing technology to add a disturbance, in other words, add a noise, to the submodel or the update data of the submodel that is reported by the service node, so that the central node cannot deduce the original training data of the service node from the submodel or the update data of the submodel. This protects the privacy of the service node and implements secure model aggregation. However, currently, in a manner of implementing secure model aggregation by adding disturbances by using the secret sharing technology, each service node needs to share, for each disturbance, N subsecrets corresponding to the disturbance with N service nodes in a system; and when the central node needs to eliminate the disturbance, the central node also needs to obtain corresponding subsecrets from at least T service nodes in the N service nodes. Consequently, communication overheads are high.

SUMMARY

Embodiments provide a secure model aggregation method and apparatus to reduce communication overheads during model aggregation.

According to a first aspect, an embodiment provides a secure model aggregation method. The method includes: a central node receives M scrambled models from M online service nodes, where a scrambled model of any online service node in the M online service nodes is determined by scrambling a submodel of the service node based on a first disturbance item and a second disturbance item that correspond to the online service node. The central node sends offline service node information to at least T online service nodes in the M online service nodes, where the offline service node information includes information about N−M offline service nodes in a service node cluster corresponding to the central node, the service node cluster includes N service nodes, N is greater than or equal to M, M is greater than or equal to T, and T is greater than or equal to 1 and less than or equal to N. The central node receives descrambling secrets from the at least T online service nodes, where a descrambling secret of any online service node in the at least T online service nodes is determined based on M first shared keys that are of the online service node and that correspond to the M online service nodes and N−M second shared keys that are of the online service node and that correspond to the N−M offline service nodes. The central node determines an aggregated model based on the M scrambled models and disturbance vectors of the M scrambled models, where the disturbance vectors are determined based on the descrambling secrets from the at least T online service nodes and at least N−T+1 first subsecrets and at least N−T+1 second subsecrets of each service node in the N service nodes, at least N−T+1 first subsecrets of any service node in the N service nodes are determined based on a first disturbance item of the service node, N first shared keys that are of the service node and that correspond to the N service nodes, and at least N−T+1 specified constants, and at least N−T+1 second subsecrets are determined based on a second disturbance item of the service node, N second shared keys that are of the service node and that correspond to the N service nodes, and the at least N−T+1 specified constants.

The secure model aggregation method may be performed by the central node, or may be implemented by a logical module or software that can implement all or some functions of the central node. The central node may be a personal computer, a notebook computer, a server, a server cluster, or the like.

According to the method, communication overheads of receiving subsecrets by the central node may be reduced to $2N(N−T+1)$, which corresponds to $2(N−T+1)$ subsecrets sent by each service node; and overheads of receiving descrambling secrets may be reduced to T, which corresponds to the descrambling secrets sent by the at least T online service nodes. In a solution in which each service node needs to share, for each disturbance, N subsecrets corresponding to the disturbance with the N service nodes, and when the central node needs to eliminate the disturbance, the central node also needs to obtain corresponding subsecrets (such as descrambling secrets) from the at least T service nodes in the N service nodes, when the service node scrambles the submodel based on the first disturbance item and the second disturbance item, communication overheads of receiving subsecrets by the central node are $2N^2$, and overheads of receiving descrambling secrets are NT. Compared with the solution, in the solution of this aspect, required signaling or messages are significantly reduced, and communication overheads are reduced.

In a possible implementation, the method further includes: the central node receives the at least N−T+1 first subsecrets and the at least N−T+1 second subsecrets from the any service node in the N service nodes.

In a possible implementation, the scrambled model of the any online service node in the M online service nodes is determined based on a sum of the submodel of the online service node and a scrambling random number, and the scrambling random number is obtained by performing a random number generation operation on a sum of the first disturbance item and the second disturbance item of the online service node by using a specified random number generation algorithm.

Optionally, the specified random number generation algorithm satisfies that a sum of a first sub scrambling random number obtained by performing a random number generation operation on the first disturbance item and a second sub scrambling random number obtained by performing a random number generation operation on the second disturbance item is equal to the scrambling random number obtained by performing the random number generation operation on the sum of the first disturbance item and the second disturbance item.

In the foregoing implementation, the submodel of the service node is scrambled by using a seed homomorphic random number generation algorithm that allows a sum of a result obtained by encrypting a plaintext A and a result obtained by encrypting a plaintext B to be the same as a result obtained by encrypting a sum of the plaintext A and the plaintext B. In this way, elimination of the scrambling random number corresponding to the first disturbance item and the second disturbance item can be supported, and separate elimination of sub scrambling random numbers corresponding to the first disturbance item and the second disturbance item can be supported. This can bring larger design space for eliminating scrambling for the scrambled model.

In a possible implementation, the at least $N-T+1$ first subsecrets of the any service node in the N service nodes are $g_i(x)=W_i+\widehat{s_{i1}}x+\widehat{s_{i2}}x^2+\ldots+\widehat{s_{iN}}x^N$, i represents a number of the service node, $i=1, 2, \ldots, N$, $W_i$ represents the first disturbance item of the service node, $\widehat{s_{i1}}$, $\widehat{s_{i2}}$, $\ldots$, and $\widehat{s_{iN}}$ represent the N first shared keys that are of the service node and that correspond to the N service nodes, a value of x is any specified constant in the at least $N-T+1$ specified constants, and $g_i(x)$ represents a first subsecret corresponding to the specified constant taken by x; and the at least $N-T+1$ second subsecrets of the any service node in the N service nodes are $\varphi_i(x)$ $B_i+\widehat{q_{i1}}x+\widehat{q_{i2}}x^2+\ldots+\widehat{q_{iN}}x^N$, i represents the number of the service node, $i=1, 2, \ldots, N$, $B_i$ represents the second disturbance item of the service node, $\widehat{q_{i1}}$, $\widehat{q_{i2}}$, $\ldots$, and $\widehat{q_{in}}$ represent the N second shared keys that are of the service node and that correspond to the N service nodes, a value of x is any specified constant in the at least $N-T+1$ specified constants, and $\varphi_i(x)$ represents a second subsecret corresponding to the specified constant taken by x.

In the foregoing implementation, a subsecret of the service node is associated with a disturbance item and a shared key of the service node. This helps the central node determine the disturbance item of the service node based on the subsecret of the service node, and therefore eliminate scrambling in the scrambled model reported by the service node.

In a possible implementation, the N first shared keys that are of the any service node in the N service nodes and that correspond to the N service nodes are determined based on N shared keys that are of the service node and that correspond to the N service nodes and a first time parameter; and the N second shared keys that are of the any service node in the N service nodes and that correspond to the N service nodes are determined based on the N shared keys that are of the service node and that correspond to the N service nodes and a second time parameter.

In the foregoing implementation, the first time parameter may be a number of a current model training round, and the second time parameter may be a sum of the number of the current model training round and a specified non-zero integer, or the like. Through introduction of the first time parameter and the second time parameter, this can avoid a problem of submodel leakage caused when the N first shared keys and/or the N second shared keys that are of the service node and that correspond to the N service nodes are leaked, and therefore scrambling of the scrambled model corresponding to the service node is eliminated.

In a possible implementation, the first disturbance item $W_i$ of the any service node in the N service nodes is equal to $\Sigma_{i<j}s_{ij}-\Sigma_{i>j}s_{ji}$, i represents the number of the any service node, $j=1, 2, \ldots, N$, and $s_{ij}$ or $s_{ji}$ represents a shared key of the service node with the number i and a service node with a number j.

In the foregoing implementation, each service node determines a first disturbance item based on a shared key that is of the service node and that corresponds to another service node. This helps implement mutual cancellation between disturbances caused by first disturbance items of different service nodes.

According to a second aspect, an embodiment provides a secure model aggregation method. The method includes: an online service node sends a scrambled model to a central node, where the scrambled model is determined by scrambling a submodel of the online service node based on a first disturbance item and a second disturbance item that correspond to the online service node. The online service node receives offline service node information from the central node, where the offline node information includes information about $N-M$ offline service nodes in a service node cluster corresponding to the central node, the service node cluster includes N service nodes, the N service nodes include the online service node, and N is greater than or equal to M. The online service node sends a descrambling secret to the central node, where the descrambling secret is determined based on M first shared keys that are of the online service node and that correspond to M online service nodes in the service node cluster and $N-M$ second shared keys that are of the online service node and that correspond to the $N-M$ offline service nodes.

The secure model aggregation method may be performed by the service node, or may be implemented by a logical module or software that can implement all or some functions of the service node. The service node may be a mobile phone, a tablet computer, a personal computer, a notebook computer, or the like.

In a possible implementation, the method further includes: the online service node sends at least $N-T+1$ first subsecrets and at least $N-T+1$ second subsecrets to the central node, where T is greater than or equal to 1 and is less than or equal to N. The at least $N-T+1$ first subsecrets are determined based on the first disturbance item, N first shared keys that are of the online service node and that correspond to the N service nodes, and at least $N-T+1$ specified constants, and the at least $N-T+1$ second subsecrets are determined based on the second disturbance item, N second shared keys that are of the online service node and that correspond to the N service nodes, and the at least $N-T+1$ specified constants.

In a possible implementation, the scrambled model is determined based on a sum of the submodel and a scrambling random number, and the scrambling random number is obtained by performing a random number generation operation on a sum of the first disturbance item and the second disturbance item by using a specified random number generation algorithm.

Optionally, the specified random number generation algorithm satisfies that a sum of a first sub scrambling random number obtained by performing a random number generation operation on the first disturbance item and a second sub scrambling random number obtained by performing a random number generation operation on the second disturbance item is equal to the scrambling random number obtained by performing the random number generation operation on the sum of the first disturbance item and the second disturbance item.

In a possible implementation, the at least N−T+1 first subsecrets are $g_i(x)=W_i+\widehat{s_{i1}}x+\widehat{s_{i2}}x^2+\ldots+\widehat{s_{iN}}x^N$, i represents a number of the online service node, $i=\widehat{s_{i1}}$ 1, 2, . . . , N, $W_i$ represents the first disturbance item, $\widehat{s_{i1}}$, $\widehat{s_{i2}}$, . . . , and $\widehat{s_{iN}}$ represent the N first shared keys that are of the online service node and that correspond to the N service nodes, a value of x is any specified constant in the at least N−T+1 specified constants, and $g_i(x)$ represents a first subsecret corresponding to the specified constant taken by x; and the at least N−T+1 second subsecrets are $\varphi_i(x)=B_i+\widehat{q_{i1}}x+\widehat{q_{i2}}x^2+\ldots+\widehat{q_{iN}}x^N$, i represents the number of the online service node, $i=1$, 2, . . . , N, $B_i$ represents the second disturbance item, $\widehat{q_{i1}}$, $\widehat{q_{i2}}$, . . . , and $\widehat{q_{in}}$ represent the N second shared keys that are of the online service node and that correspond to the N service nodes, a value of x is any specified constant in the at least N−T+1 specified constants, and $\varphi_i(x)$ represents a second subsecret corresponding to the specified constant taken by x.

In a possible implementation, the N first shared keys that are of the online service node and that correspond to the N service nodes are determined based on N shared keys that are of the online service node and that correspond to the N service nodes and a first time parameter; and the N second shared keys that are of the online service node and that correspond to the N service nodes are determined based on the N shared keys that are of the online service node and that correspond to the N service nodes and a second time parameter.

In a possible implementation, the first disturbance item $W_i$ is equal to $\Sigma_{i<k}s_{ij}-\Sigma_{i>j}s_{ji}$, i represents the number of the online service node, $j=1$, 2, . . . , N, and $s_{ij}$ or $s_{ji}$ represents a shared key of the online service node with the number i and a service node with a number j.

According to a third aspect, an embodiment provides a secure model aggregation apparatus. The apparatus is used in a central node, and includes an input/output unit and a processing unit. The input/output unit is configured to receive M scrambled models from M online service nodes, where a scrambled model of any online service node in the M online service nodes is determined by scrambling a submodel of the service node based on a first disturbance item and a second disturbance item that correspond to the online service node. The input/output unit is further configured to: send offline service node information to at least T online service nodes in the M online service nodes, where the offline service node information includes information about N−M offline service nodes in a service node cluster corresponding to the central node, the service node cluster includes N service nodes, N is greater than or equal to M, M is greater than or equal to T, and T is greater than or equal to 1 and less than or equal to N; and receive descrambling secrets from the at least T online service nodes, where a descrambling secret of any online service node in the at least T online service nodes is determined based on M first shared keys that are of the online service node and that correspond to the M online service nodes and N−M second shared keys that are of the online service node and that correspond to the N−M offline service nodes. The processing unit is configured to determine an aggregated model based on the M scrambled models and disturbance vectors of the M scrambled models, where the disturbance vectors are determined based on the descrambling secrets from the at least T online service nodes and at least N−T+1 first subsecrets and at least N−T+1 second subsecrets of each service node in the N service nodes, at least N−T+1 first subsecrets of any service node in the N service nodes are determined based on a first disturbance item of the service node, N first shared keys that are of the service node and that correspond to the N service nodes, and at least N−T+1 specified constants, and at least N−T+1 second subsecrets are determined based on a second disturbance item of the service node, N second shared keys that are of the service node and that correspond to the N service nodes, and the at least N−T+1 specified constants.

In a possible implementation, the input/output unit is further configured to receive the at least N−T+1 first subsecrets and the at least N−T+1 second subsecrets from the any service node in the N service nodes.

In a possible implementation, the scrambled model of the any online service node in the M online service nodes is determined based on a sum of the submodel of the online service node and a scrambling random number, and the scrambling random number is obtained by performing a random number generation operation on a sum of the first disturbance item and the second disturbance item of the online service node by using a specified random number generation algorithm.

Optionally, the specified random number generation algorithm satisfies that a sum of a first sub scrambling random number obtained by performing a random number generation operation on the first disturbance item and a second sub scrambling random number obtained by performing a random number generation operation on the second disturbance item is equal to the scrambling random number obtained by performing the random number generation operation on the sum of the first disturbance item and the second disturbance item.

In a possible implementation, the at least N−T+1 first subsecrets of the any service node in the N service nodes are $g_i(x)=W_i+\widehat{s_{i1}}x+\widehat{s_{i2}}x^2+\ldots+\widehat{s_{iN}}x^N$, i represents a number of the service node, $i=1$, 2, . . . , N, $W_i$ represents the first disturbance item of the service node, $\widehat{s_{i1}}$, $\widehat{s_{i2}}$, . . . , and $\widehat{s_{iN}}$ represent the N first shared keys that are of the service node and that correspond to the N service nodes, a value of x is any specified constant in the at least N−T+1 specified constants, and $g_i(x)$ represents a first subsecret corresponding to the specified constant taken by x; and the at least N−T+1 second subsecrets of the any service node in the N service nodes are $\varphi_i(x)=B_i+\widehat{q_{i1}}x+\widehat{q_{i2}}x^2+\ldots+\widehat{q_{iN}}x^N$, i represents the number of the service node, $i=1$, 2, . . . , N, $B_i$ represents the second disturbance item of the service node, $\widehat{q_{i1}}$, $\widehat{q_{i2}}$, . . . , and $\widehat{q_{in}}$ represent the N second shared keys that are of the service node and that correspond to the N service nodes, a value of x is any specified constant in the at least N−T+1 specified constants, and $\varphi_i(x)$ represents a second subsecret corresponding to the specified constant taken by x.

In a possible implementation, the N first shared keys that are of the any service node in the N service nodes and that correspond to the N service nodes are determined based on N shared keys that are of the service node and that correspond to the N service nodes and a first time parameter; and the N second shared keys that are of the any service node in the N service nodes and that correspond to the N service nodes are determined based on the N shared keys that are of the service node and that correspond to the N service nodes and a second time parameter.

In a possible implementation, the first disturbance item $W_i$ of the any service node in the N service nodes is equal to $\Sigma_{i<j}s_{ij}-\Sigma_{i>j}s_{ji}$, i represents the number of the service node, j=1, 2, . . . , N, and $s_{ij}$ or $s_{ji}$ represents a shared key of the service node with the number i and a service node with a number j.

According to a fourth aspect, an embodiment provides a secure model aggregation apparatus. The apparatus is used in an online service node, and includes an input/output unit and a processing unit. The input/output unit is configured to: send a scrambled model to a central node, where the scrambled model is determined by scrambling a submodel of the online service node based on a first disturbance item and a second disturbance item that correspond to the online service node; and receive offline service node information from the central node, where the offline node information includes information about N–M offline service nodes in a service node cluster corresponding to the central node, the service node cluster includes N service nodes, the N service nodes include the online service node, and N is greater than or equal to M. The processing unit is configured to determine a descrambling secret based on M first shared keys that are of the online service node and that correspond to M online service nodes in the service node cluster and N–M second shared keys that are of the online service node and that correspond to the N–M offline service nodes. The input/output unit is further configured to send the descrambling secret to the central node.

In a possible implementation, the input/output unit is further configured to send at least N–T+1 first subsecrets and at least N–T+1 second subsecrets to the central node, where T is greater than or equal to 1 and is less than or equal to N. The at least N–T+1 first subsecrets are determined based on the first disturbance item, N first shared keys that are of the online service node and that correspond to the N service nodes, and at least N–T+1 specified constants, and the at least N–T+1 second subsecrets are determined based on the second disturbance item, N second shared keys that are of the online service node and that correspond to the N service nodes, and the at least N–T+1 specified constants.

In a possible implementation, the scrambled model is determined based on a sum of the submodel and a scrambling random number, and the scrambling random number is obtained by performing a random number generation operation on a sum of the first disturbance item and the second disturbance item by using a specified random number generation algorithm.

Optionally, the specified random number generation algorithm satisfies that a sum of a first sub scrambling random number obtained by performing a random number generation operation on the first disturbance item and a second sub scrambling random number obtained by performing a random number generation operation on the second disturbance item is equal to the scrambling random number obtained by performing the random number generation operation on the sum of the first disturbance item and the second disturbance item.

In a possible implementation, the at least N–T+1 first subsecrets are $g_i(x)=W_i+\widehat{s_{i1}}x+\widehat{s_{i2}}x^2+\ldots+\widehat{s_{iN}}x^N$, i represents a number of the online service node, i=1, 2, . . . , N, $W_i$ represents the first disturbance item, $\widehat{s_{i1}}$, $\widehat{s_{i2}}$, . . . , and $\widehat{s_{iN}}$ represent the N first shared keys that are of the online service node and that correspond to the N service nodes, a value of x is any specified constant in the at least N–T+1 specified constants, and $g_i(x)$ represents a first subsecret corresponding to the specified constant taken by x; and the at least N–T+1 second subsecrets are $\varphi_i(x)$ $B_i+\widehat{q_{i1}}x+\widehat{q_{i2}}x^2+\ldots+\widehat{q_{iN}}x^N$, i represents the number of the online service node, i=1, 2, . . . , N, $B_i$ represents the second disturbance item, $\widehat{q_{i1}}$, $\widehat{q_{i2}}$, . . . , and $\widehat{q_{in}}$ represent the N second shared keys that are of the online service node and that correspond to the N service nodes, a value of x is any specified constant in the at least N–T+1 specified constants, and $\varphi_i(x)$ represents a second subsecret corresponding to the specified constant taken by x.

In a possible implementation, the N first shared keys that are of the online service node and that correspond to the N service nodes are determined based on N shared keys that are of the online service node and that correspond to the N service nodes and a first time parameter; and the N second shared keys that are of the online service node and that correspond to the N service nodes are determined based on the N shared keys that are of the online service node and that correspond to the N service nodes and a second time parameter.

In a possible implementation, the first disturbance item $W_i$ is equal to $\Sigma_{i<j}s_{ij}-\Sigma_{i>j}s_{ji}$, i represents the number of the online service node, j=1, 2, . . . , N, and s or $s_{ji}$ represents a shared key of the online service node with the number i and a service node with a number j.

According to a fifth aspect, an embodiment provides a secure model aggregation apparatus. The secure model aggregation apparatus includes an interface circuit and a processor, and the processor and the interface circuit are coupled to each other. The processor is configured to implement the method according to the first aspect or any one of the possible implementations of the first aspect by using a logic circuit or executing code instructions. The interface circuit is configured to: receive a signal from an apparatus other than the secure model aggregation apparatus and transmit the signal to the processor, or send a signal from the processor to an apparatus other than the secure model aggregation apparatus. It may be understood that the interface circuit may be a transceiver, a transceiver machine, a transceiver, or an input/output interface.

Optionally, the secure model aggregation apparatus may further include a memory configured to: store instructions executed by the processor, or store input data required for running instructions by the processor, or store data generated after the processor runs instructions. The memory may be a physically independent unit, or may be coupled to the processor. Alternatively, the processor includes the memory.

According to a sixth aspect, an embodiment provides a secure model aggregation apparatus. The secure model aggregation apparatus includes an interface circuit and a processor, and the processor and the interface circuit are coupled to each other. The processor is configured to implement the method according to the second aspect or any one of the possible implementations of the second aspect by using a logic circuit or executing code instructions. The interface circuit is configured to: receive a signal from an apparatus other than the secure model aggregation apparatus and transmit the signal to the processor, or send a signal from the processor to an apparatus other than the secure model aggregation apparatus. It may be understood that the interface circuit may be a transceiver, a transceiver machine, a transceiver, or an input/output interface.

Optionally, the secure model aggregation apparatus may further include a memory configured to: store instructions executed by the processor, or store input data required for running instructions by the processor, or store data generated after the processor runs instructions. The memory may be a physically independent unit, or may be coupled to the processor. Alternatively, the processor includes the memory.

According to a seventh aspect, an embodiment provides a secure model aggregation system. The secure model aggregation system includes a central node and a service node. The central node may implement the method according to the first aspect or any one of the possible implementations of the first aspect, and the service node may implement the method according to the second aspect or any one of the possible implementations of the second aspect.

According to an eighth aspect, an embodiment provides a non-transitory computer-readable storage medium. The non-transitory computer readable storage medium stores a computer program or instructions. When the computer program or the instructions are executed, the method according to the first aspect or any one of the possible implementations of the first aspect may be implemented, or the method according to the second aspect or any one of the possible implementations of the second aspect may be implemented.

According to a ninth aspect, an embodiment further provides a computer program product, including a computer program or instructions. When the computer program or the instructions are executed, the method according to the first aspect or any one of the possible implementations of the first aspect may be implemented, or the method according to the second aspect or any one of the possible implementations of the second aspect may be implemented.

According to a tenth aspect, an embodiment further provides a chip. The chip is coupled to a memory, and is configured to read and execute a program or instructions stored in the memory, to implement the method according to the first aspect or any one of the possible implementations of the first aspect, or implement the method according to the second aspect or any one of the possible implementations of the second aspect.

For effects that can be achieved in the second aspect to the tenth aspect, refer to effects that can be achieved in the first aspect. Details are not described herein again.

DETAILED DESCRIPTION OF EMBODIMENTS

Figure 1:
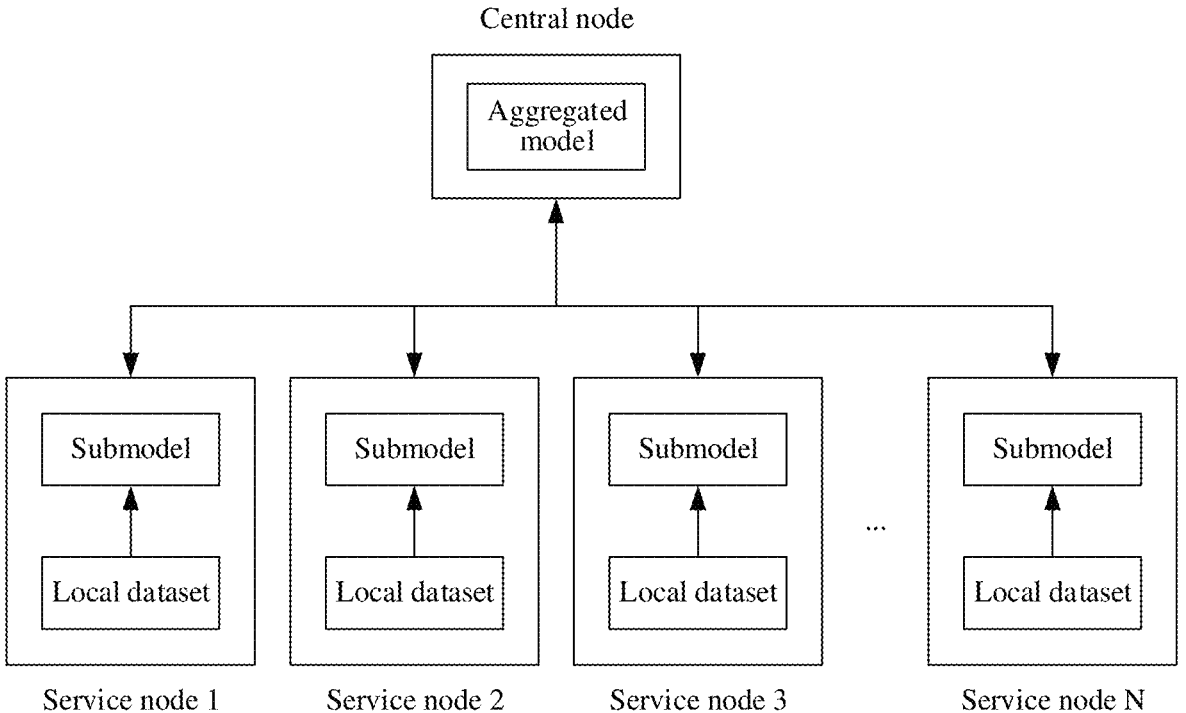
FIG. 1 is a diagram of an architecture of a federated learning system according to an embodiment.

Solutions in embodiments may be applied to model aggregation scenarios such as a federated learning system. FIG. 1 is a diagram of an architecture of a federated learning system according to an embodiment. As shown in FIG. 1, the system includes a central node and service nodes. One central node and N service nodes are used as an example. N is an integer greater than or equal to 2. In the federated learning system shown in FIG. 1, the service node may train, based on local training data in a local dataset by using an artificial intelligence (AI) algorithm, a submodel of the service node, and send a submodel obtained through training to the central node. The central node integrates submodels reported by a plurality of service nodes, to obtain an aggregated model, and may send the aggregated model to each service node for application.

It should be understood that, during each round of model training, each service node may alternatively report update data of a submodel, and the central node updates a local aggregated model of the central node based on update data of submodels that is reported by a plurality of service nodes, to obtain an updated aggregated model.

The service node may also be referred to as a client, a data service node (DSC), or the like; and may be a mobile phone, a tablet computer, a personal computer (PC), a notebook computer, or the like. The central node may be referred to as a server, a data central node (DSC), or the like; and may be a PC, a notebook computer, a server, a server cluster, or the like.

For ease of understanding by a person skilled in the art, the following first explains and describes some terms in embodiments.

(1) Drop out: "Drop out" may mean that a service node cannot participate in federated learning due to a link interruption or the like, and may be understood as that the service node exits a federated learning system, or the service node is offline and cannot communicate with a central node and another service node.

(2) Differential privacy: Differential privacy is a data sharing means, and can be used to share only some statistical features of a database without disclosing specific personal information. The intuitive idea behind differential privacy is that if impact of random modification of a record in the database is small enough, an obtained statistical feature cannot be used to deduce content of a single record. This characteristic can be used to protect privacy. In differential privacy, a noise is added to original data or an original model, to avoid deduction of information about original training data from an updated model, and therefore protect privacy of the original training data.

(3) Homomorphic encryption: Homomorphic encryption is a form of encryption, allows an encrypted result to be obtained by performing a specific form of algebraic operation on a ciphertext, and allows a result obtained by decrypting the encrypted result to be the same as a result obtained by performing the same operation on a plaintext. In other words, this technology enables people to perform operations such as retrieval and comparison in encrypted data to obtain a correct result, and there is no need to decrypt the data in an entire processing process. Through homomorphic encryption, when scrambled models reported by a plurality of service nodes are aggregated, data plaintexts of the models may not need to be used.

(4) Seed homomorphic encryption: Seed homomorphic encryption is special homomorphic encryption. In addition to satisfying a characteristic of homomorphic encryption, seed homomorphic encryption further allows a sum of a result obtained by encrypting a plaintext A and a result obtained by encrypting a plaintext B to be the same as a result obtained by encrypting a sum of the plaintext A and the plaintext B. Similarly, a sum of a result obtained by decrypting a ciphertext obtained by encrypting the plaintext A and a result obtained by decrypting a ciphertext obtained by encrypting the plaintext B is the same as a result obtained by decrypting a ciphertext obtained by encrypting the sum of the plaintext A and the plaintext B. It should be understood that the foregoing uses the plaintext A and the plaintext B as an example for description. Seed homomorphic encryption is not only applicable to two plaintexts, but also applicable to a case of a plurality of plaintexts.

(5) Secret sharing: Secret sharing may also be referred to as secret splitting, and refers to a method for splitting and distributing a secret message among a group of participants. A secret message share, such as a subsecret corresponding to the secret message, is allocated to each of the participants. The secret message can only be reconstructed when enough subsecrets are combined together. Each independent subsecret cannot be used alone to reconstruct the secret message. In secret sharing, a secret message (S) is split into N subsecrets, given the secret message (S), a quantity (N) of required subsecrets (such as shares), and a quantity threshold (T). The original secret message may be reconstructed based on any T different subsecrets. If a quantity of subsecrets is less than T, access to the secret message S is prohibited. For example, a secret password may be split into three subsecrets (N=3), and a threshold is 2 (T=2). The three subsecrets may be distributed among three administrators. Each administrator has a different subsecret. Because the threshold is 2, no single administrator can reconstruct the secret password. At least two administrators are required to reconstruct the secret password based on two corresponding subsecrets distributed to the two administrators.

(6) Diffie-hellman (DH) algorithm: The DH algorithm is a key exchange algorithm that can be used to ensure that a shared key securely traverses an insecure network. An advantage of this mechanism is that two parties that require secure communication can use this method to determine a symmetric key, which may also be referred to as a shared key. Then, the key can be used for encryption and decryption. However, it should be noted that this key exchange protocol/algorithm can be used only for key exchange, but cannot be used for message encryption or decryption. The following provides an example: (1) It is assumed that a user A and a user B expect to exchange a key, and there are two globally disclosed parameters: a prime number q and an integer a, where a is a primitive root of q. The user A selects a random number XA (XA<q) as a private key, and calculates a public key $YA=a^XA \bmod q$. A secretly stores a value of XA, so that YA can be publicly obtained by B. Similarly, the user B selects a random number XB<q as a private key, and calculates a public key $YB=a^XB \bmod q$. B secretly stores a value of XB, so that YB can be publicly obtained by A. (2) A calculation manner in which the user A generates a shared key is $K=(YB)^XA \bmod q$. Similarly, a calculation manner in which the user B generates a shared key is $K=(YA)^XB \bmod q$. The two calculation manners generate a same result, for example, $K=(YB)^XA \bmod q=(a^XB \bmod q)^XA \bmod q=(a^XB)^XA \bmod q$ (obtained according to a modulo operation rule)$=a^(XBXA) \bmod q=(a^XA)^XB \bmod q=(a^XA \bmod q)^XB \bmod q=(YA)^XB \bmod q$. Therefore, it is equivalent to that both parties have exchanged a same key, in other words, both parties have obtained the same shared key. Because XA and XB are secretly stored, an attacker cannot obtain the shared key of the user A and the user B.

The architecture of the federated learning system shown in FIG. 1 is still used as an example. Currently, during secure model aggregation, a service node i first generates a key pair including a public key $PK_i$ and a private key $SK_i$, where i=1, 2, . . . , N; and generates a shared key $s_{ij}$ with a service node j in the federated learning system by using the DH algorithm, where j=1, 2, . . . , N.

It is assumed that a submodel of the service node i is $x_i$. In this case, a scrambled model of the service node i is $y_i=x_i+p_i$. $p_i=\Sigma_{i<j}PRG(s_{ij})-\Sigma_{i>j}PRG(s_{ji})$, where PRG represents a pseudo random generator (pseudo random generator) or algorithm, $PRG(s_{ij})$ represents a pseudo random number generated by performing an operation corresponding to PRG on $s_{ij}$, and $p_1$ represents a scrambling random number corresponding to the service node i. If all the N service nodes in the federated learning system report scrambled models, the central node calculates an aggregated model $$\sum_{i=1}^{N} y_i = \sum_{i=1}^{N} x_i + \sum_{i=1}^{N} p_i = \sum_{i=1}^{N} x_i$$

of the N service nodes. $p_i$ of the N service nodes may cancel each other out. In an example, it is assumed that N=3, $p_1=PRG(s_{12})+PRG(s_{13})$, $p_2=PRG(s_{23})-PRG(s_{21})$, and $p_3=-PRG(s_{31})-PRG(s_{32})$. In addition, it can be understood from the DH algorithm that shared public keys of the service node i and the service node j are the same, that is, $s_{ij}=s_{ji}$, for example, $s_{12}=s_{21}$. In this case, a sum of $p_1$, $p_2$, and $p_3$ is 0, which means $p_1$, $p_2$, and $p_3$ cancel each other out.

If some service nodes are offline before sending scrambled models, and do not send the scrambled models, the central node cannot obtain an accurate global model through aggregation. In this case, $\Sigma_{i\in [N]\backslash D}y_i=\Sigma_{i\in [N]\backslash D}x_i-\Sigma_{i\in D}p_i$. D represents a set of offline service nodes, including a number of the offline service node, and [N]\D represents a set of online service nodes, including a number of the online service node.

Figure 2:
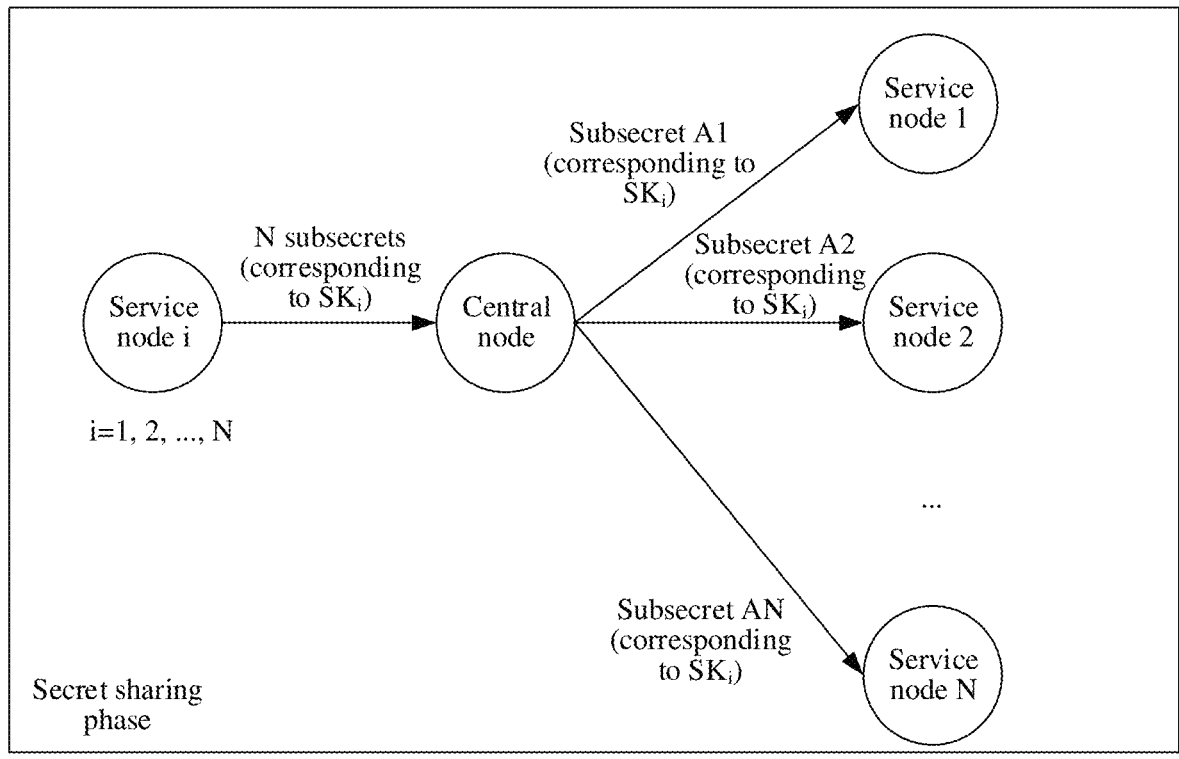
FIG. 2 is a diagram 1 of communication overheads in a secret sharing phase according to an embodiment.
Figure 2:
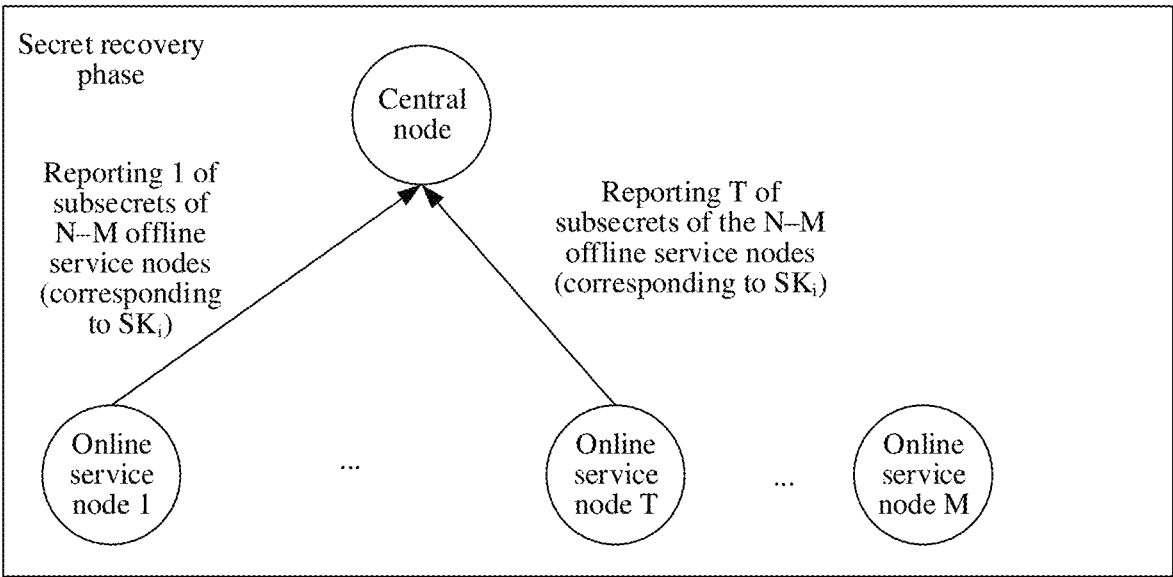

When a service node is offline, a secret sharing manner may be used for resolution. Details are as follows:

As shown in FIG. 2, in a secret sharing phase, any service node i in the N service nodes may divide a private key $SK_i$ of the service node i into N subsecrets, and forward the N subsecrets to the N service nodes in the federated learning system through the central node, where i=1, 2, . . . , N.

If a service node is offline and does not upload a scrambled model on time, in a secret recovery phase, the central node may obtain, from each online service node in T service nodes, subsecrets that are of the service node and that correspond to N−M offline service nodes, and obtain, from the T service nodes in total, T subsecrets corresponding to each offline service node in the N−M offline service nodes. For each offline service node i in the N−M offline service nodes (where i∈ D, and D represents the set of offline service nodes, including the number of the offline service node), a DSS can restore a private key $SK_i$ of the offline service node i. With reference to a public key disclosed by each service node in the N service nodes, the central node can calculate a shared key $s_{ij}$ (where j=1, 2, . . . , N) that is of the offline service node i and that corresponds to each service node, to obtain $p_i$ of the offline service node i; and may determine a disturbance vector i∈ D $p_i$ based on $p_i$ corresponding to each offline service node, to eliminate a disturbance $-\Sigma_{i \in D}\, p_i$ in $\Sigma_{i \in [N] \backslash D}\, y_i = \Sigma_{i \in [N] \backslash D}\, x_i - \Sigma_{i \in D}\, p_i$.

According to the method, if the central node receives a scrambled model $y_i = x_i + p_i$ of the offline service node i after obtaining the private key $SK_i$ of the offline service node i (where for example, the scrambled model is not uploaded in time due to a communication delay), a fake drop out (fake drop out) situation occurs. The central node may eliminate $p_i$ of the scrambled model, and an original submodel $x_i$ of the offline service node i is exposed, which causes a risk of privacy leakage. To avoid occurrence of this case, the following method may be used for resolution.

Figure 3:
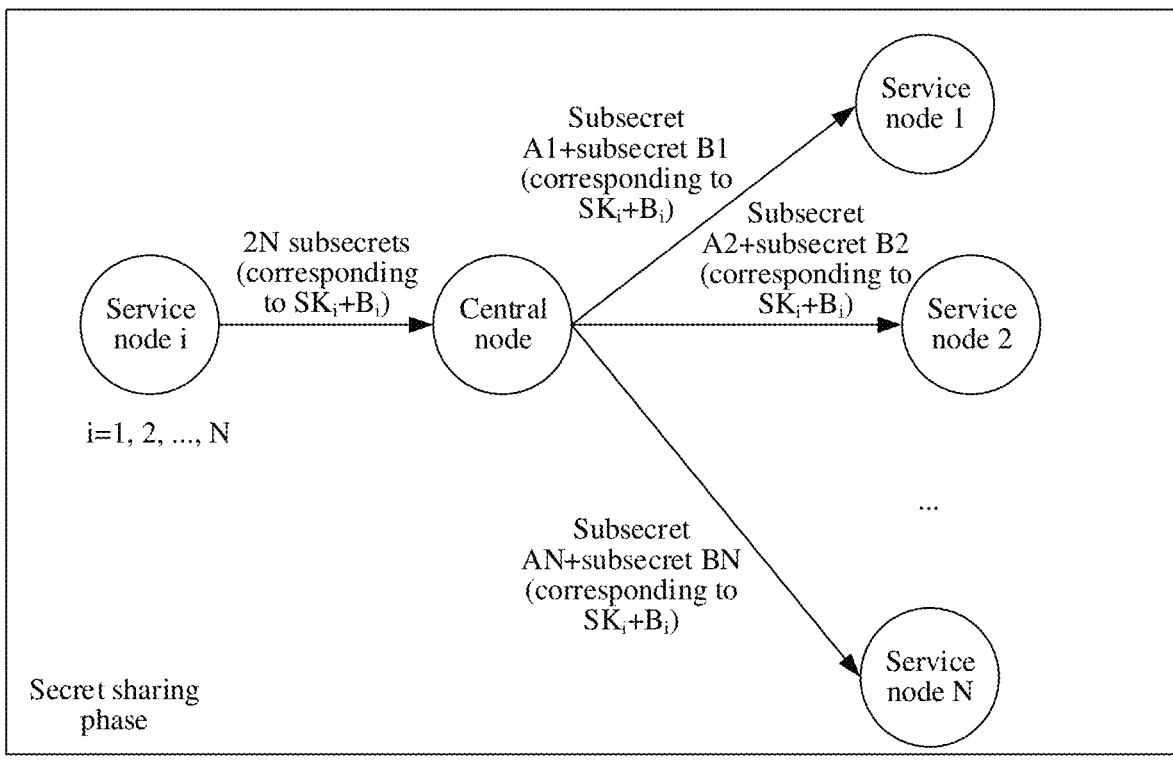
FIG. 3 is a diagram 1 of communication overheads in a secret recovery phase according to an embodiment.
Figure 3:
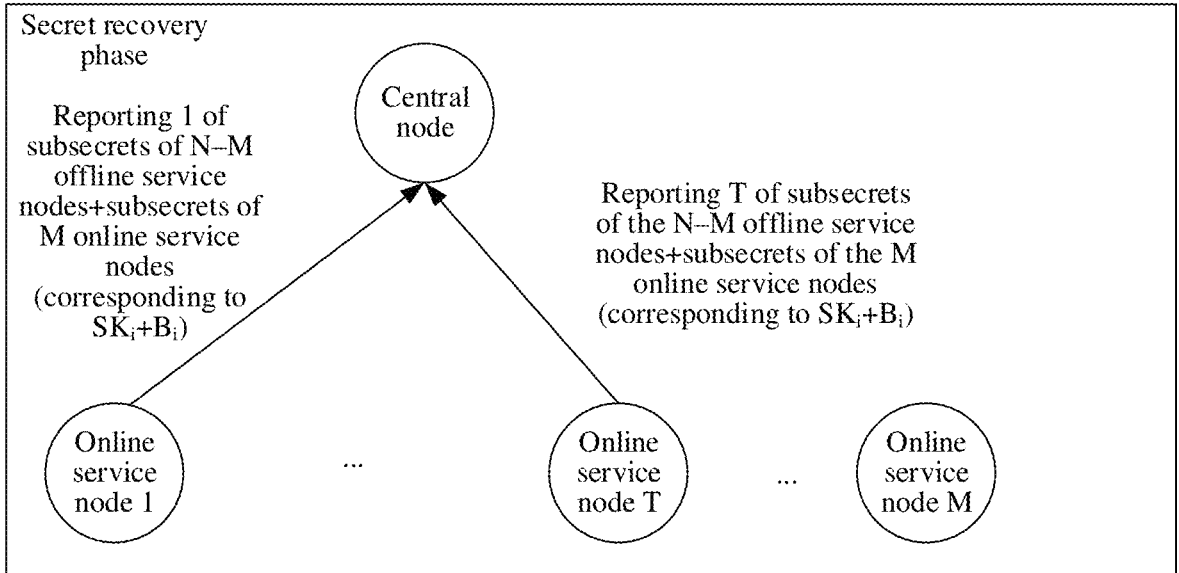

First, a scrambled model of any service node i in the N service nodes is corrected to $y_i = x_i + PRG(B_i) + p_i$. $p_i = \Sigma_{i<j} PRG(s_{ij}) - \Sigma_{i>j} PRG(s_{ji})$. $B_i$ is a disturbance item corresponding to the service node i, and may be a random number or a specific value. As shown in FIG. 3, the service node i also divides $B_i$ into N subsecrets, and forwards the subsecrets to the N service nodes in the federated learning system through the central node. An aggregated model obtained by the central node is $\Sigma_{i \in [N] \backslash D}\, y_i = \Sigma_{i \in [N] \backslash D}\, x_i + \Sigma_{i \in [N] \backslash D}\, PRG(B_i) - \Sigma_{i \in D}\, p_i$. D represents the set of offline service nodes, including the number of the offline service node, and [N]\D represents the set of online service nodes, including the number of the online service node. For an offline service node i (where $i \in D$), the central node can obtain at least T subsecrets corresponding to $SK_i$, to restore the private key $SK_i$ of the offline service node i, so as to determine corresponding $p_i$ to eliminate $-\Sigma_{i \in D}\, p_i$. For an online service node i, the central node obtains at least T subsecrets corresponding to $B_i$, to restore $B_i$ of the online service node i, so as to eliminate $\Sigma_{i \in [N] \backslash D}\, PRG(B_i)$.

It can be understood from the foregoing secure model aggregation method that, in the secret sharing phase, the central node needs to forward 2N subsecrets for each service node, that is, a total of $2N^2$ subsecrets; and in the secret recovery phase, the central node needs to request N subsecrets (including subsecrets corresponding to private keys $SK_i$ of the N–M offline service nodes and subsecrets corresponding to disturbance items $B_i$ of M online service nodes) from each service node in at least T online service nodes, that is, a total of at least 2NT subsecrets. Consequently, communication overheads of model aggregation are high.

In view of this, embodiments provide a model aggregation method, to reduce communication overheads of model aggregation. The following describes in detail embodiments with reference to accompanying drawings.

In addition, it should be understood that a "key" mentioned in embodiments may also be referred to as a "key"; and ordinal numbers such as "first" and "second" mentioned in embodiments are used to distinguish between a plurality of objects, and are not used to limit sizes, content, a sequence, a time sequence, priorities, importance degrees, or the like of the plurality of objects. For example, a first threshold and a second threshold may be a same threshold, or may be different thresholds. In addition, this type of name does not indicate that values, corresponding parameters, priorities, importance degrees, or the like of the two thresholds are different.

In embodiments, unless otherwise specified, a quantity of nouns indicates "a singular noun or a plural noun", that is, "one or more". "At least one" means one or more, and "a plurality of" means two or more. "And/or" describes an association relationship between associated objects and represents that three relationships may exist. For example, A and/or B may represent the following cases: only A exists, both A and B exist, and only B exists, where A and B may be singular or plural. The character "/" generally indicates an "or" relationship between associated objects. For example, A/B indicates A or B. "At least one of the following items (pieces)" or a similar expression thereof refers to any combination of these items, including any combination of singular items (pieces) or plural items (pieces). For example, at least one of a, b, or c represents: a, b, c, a and b, a and c, b and c, or a, b, and c, where a, b, and c may be singular or plural.

Figure 4:
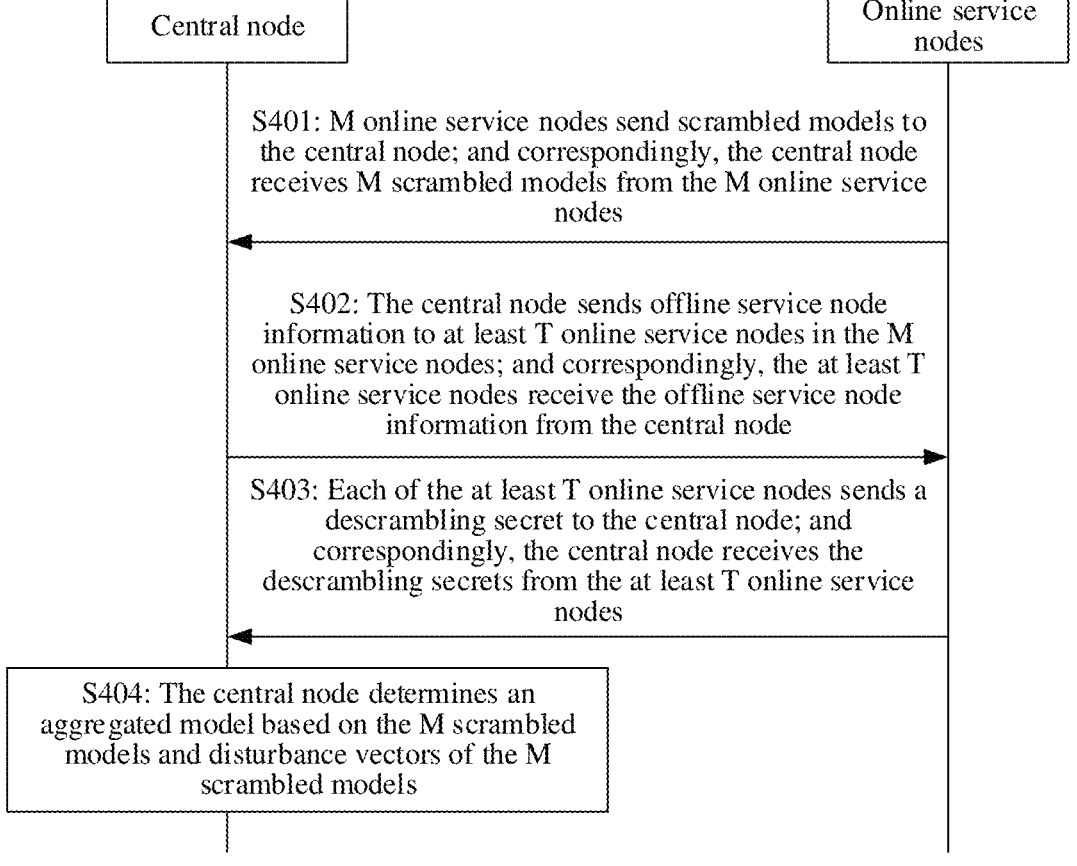
FIG. 4 is a diagram of a secure model aggregation method according to an embodiment.

FIG. 4 is a diagram of a secure model aggregation method according to an embodiment. In FIG. 4, an example in which a central node and a service node are used as execution bodies is used to describe the method. However, execution bodies of the method are not limited. For example, the central node in FIG. 4 may alternatively be a chip, a chip system, or a processor that supports the central node in implementing the method, or may be a logical module or software that can implement all or some functions of the central node; and the service node in FIG. 4 may alternatively be a chip, a chip system, or a processor that supports the service node in implementing the method, or may be a logical module or software that can implement all or some functions of the service node. The method includes the following steps.

S401: M online service nodes send scrambled models to the central node; and correspondingly, the central node receives M scrambled models from the M online service nodes.

A scrambled model of any online service node in the M online service nodes is determined by scrambling a submodel of the service node based on a first disturbance item and a second disturbance item that correspond to the online service node.

The federated learning system shown in FIG. 1 is still used as an example. The N service nodes form a service node cluster corresponding to the central node in the federated learning system. Each service node in the N service nodes may generate a key pair including a public key and a private key, and disclose the public key of the service node to the central node and another service node in the federated learning system. In an example, a service node i in the N service nodes may generate a key pair including a public key $PK_i$ and a private key $SK_i$, and disclose the public key $PK_i$ of the service node i to the central node and another service node, where $i = 1, 2, \ldots, N$.

In addition, the service node i may further determine a shared key $S_{ij}$ of the service node i and a service node j based on the private key $SK_i$ of the service node i and a public key $PK_j$ of the service node j, where $j = 1, 2, \ldots, N$. In an example, when i is 2 and j is 1, a service node 2 may determine a shared key $S_{21}$ of the service node 2 and a service node 1 based on a private key $SK_2$ of the service node 2 and a public key $PK_i$ of the service node 1; when i is 2 and j is 2, a service node 2 may determine, based on a private key $SK_2$ of the service node 2 and a public key $PK_2$ of the service node 2, a shared key $S_{22}$ that is of the service node 2 and that corresponds to the service node 2; when i is 2 and j is 3, a service node 2 may determine a shared key $S_{23}$ of the service node 2 and a service node 3 based on a private key $SK_2$ of the service node 2 and a public key $PK_3$ of the service node 3; . . . ; or when i is 2 and j is N, a service node 2 may determine a shared key $S_{2N}$ of the service node 2 and a service node N based on a private key $SK_2$ of the service node 2 and a public key $PK_N$ of the service node N.

A scrambled model of any service node i (where $i = 1, 2, \ldots, N$) in the N service nodes may be determined based on a submodel of the service node i and a scrambling random number determined based on a first disturbance item $W_i$ and a second disturbance item $B_i$ that correspond to the service node i. The first disturbance item $W_i$ and the second disturbance item $B_i$ that correspond to the service node i may be two random numbers preconfigured for the service node i, two random numbers generated by the service node i, or two random numbers determined by the service node according to a specific rule.

In a possible implementation, to facilitate mutual cancellation between disturbances caused by first disturbance items of different service nodes when the central node performs model aggregation on scrambled models from service nodes, the first disturbance item $W_i$ of the service node i may be determined based on a shared key that is of the service node i and that corresponds to another service node, for example, $W_i = \Sigma_{i<j} s_{ij} - \Sigma_{i>j} s_{ji}$. In subsequent embodiments, that $W_i = \Sigma_{i<j} s_{ij} - \Sigma_{i>j} s_{ji}$ is used as an example for description.

To improve flexibility of scrambling elimination, scrambling brought by the first disturbance item $W_i$ and scrambling brought by the second disturbance item $B_i$ can be eliminated together or separately. In this embodiment, the service node i may perform a random number generation operation on a sum of the first disturbance item $W_i$ and the second disturbance item $B_i$ by using a random number generation algorithm of seed homomorphic encryption, to obtain the scrambling random number, and determine the scrambled model $Y_i$ of the service node based on a sum of the submodel $X_i$ of the service node i and the scrambling random number. For example, the random number generation algorithm of seed homomorphic encryption is a seed homomorphic PRG. In this case, the scrambled model may be represented as $y_i = x_i + PRG(B_i + W_i)$. $PRG(B_i + W_i)$ indicates performing a random number generation operation on the sum of the first disturbance item $W_i$ and the second disturbance item $B_i$ by using the seed homomorphic PRG, to obtain a scrambling random number.

Because the random number generation algorithm of seed homomorphic encryption, for example, the seed homomorphic PRG, is used, the scrambling random number $PRG(B_i + W_i)$ obtained by the service node i by performing the random number generation operation on the sum of the first disturbance item $W_i$ and the second disturbance item $B_i$ is equal to a sum of a second sub scrambling random number PRG B obtained by performing a random number generation operation on the second disturbance item $B_i$ and a first sub scrambling random number PRG $W_i$ obtained by performing a random number generation operation on the first disturbance item $W_i$, that is, $PRG(B_i + W_i) = PRG\ B_i + PRG\ W_i$.

S402: The central node sends offline service node information to at least T online service nodes in the M online service nodes; and correspondingly, the at least T online service nodes receive the offline service node information from the central node.

When a service node is offline, for resolution, scrambling in a scrambled model reported by the service node can be eliminated. In this embodiment, the any service node i in the N service nodes determines at least N−T+1 first subsecrets based on the first disturbance item $W_i$ of the service node i, N first shared keys that are of the service node i and that correspond to the N service nodes, and at least N−T+1 specified constants, determines at least N−T+1 second subsecrets based on the second disturbance item $B_i$ of the service node i, N second shared keys that are of the service node and that correspond to the N service nodes, and the at least N−T+1 specified constants, and sends the at least N−T+1 first subsecrets and the at least N−T+1 second subsecrets to the central node.

The N first shared keys that are of the service node i and that correspond to the N service nodes may be determined based on N shared keys that are of the service node i and that correspond to the N service nodes and a first parameter. The N second shared keys that are of the service node i and that correspond to the N service nodes may be determined based on the N shared keys that are of the service node i and that correspond to the N service nodes and a second parameter.

For example, the first parameter and the second parameter may be set parameter values. For example, the first parameter is 8, and the second parameter is 9. Further, to avoid leakage of the N first shared keys and the N second shared keys that are of the service node and that correspond to the N service nodes, the first parameter and the second parameter may alternatively be time-related parameters. For example, the first parameter may be a first time parameter f(time), and the second parameter may be a second time parameter f' (time). The first time parameter f(time) may be a number of a current model training round, and the second time parameter f' (time) is time of current model training; or the first time parameter f(time) is a number of a current model training round, and the second time parameter f' (time) is a sum of the number of the current model training round and a specified non-zero integer; or the like.

In some implementations, a shared key $S_{ij}$ that is of the service node i and that corresponds to a service node j (in other words, the shared key $S_{ij}$ of the service node i and the service node j) and the first time parameter f(time) may be used as inputs of a one-way function, and an output of the one-way function is used as a first shared key $\widehat{s_{ij}}$ that is of the service node i and that corresponds to the service node j. For example, the first shared key $\widehat{s_{ij}}$ that is of the service node i and that corresponds to the service node j may be $\widehat{s_{ij}} = hash(s_{ij} \| f(time))$, and hash is a hash function.

Similarly, the shared key $S_{ij}$ that is of the service node i and that corresponds to the service node j and the second time parameter f' (time) may be used as inputs of a one-way function, and an output of the one-way function is used as a second shared key $\widehat{q_{ij}}$ that is of the service node i and that corresponds to the service node j. For example, the second shared key $\widehat{q_{ij}}$ that is of the service node i and that corresponds to the service node j may be $\widehat{q_{ij}} = hash(s_{ij} \| f'\ (time))$, and hash is a hash function.

In a possible implementation, the at least N−T+1 first subsecrets of the service node i may be $g_i(x) = W_i + \widehat{s_{i1}} x + \widehat{s_{i2}} x^2 + \ldots + \widehat{s_{iN}} x^N$. i represents a number of the service node i i=1, 2, ..., N, $W_i$ represents the first disturbance item of the service node i, $\widehat{s_{i1}}$, $\widehat{s_{i2}}$, ..., and $\widehat{s_{iN}}$ represent the N first shared keys that are of the service node i and that $\widehat{s_{i2}}$ correspond to the N service nodes, a value of x is any specified constant in the at least N−T+1 specified constants, and $g_i(x)$ represents a first subsecret corresponding to the specified constant taken by x.

For example, there are N−T+1 specified constants, and the N−T+1 specified constants are separately $u_1$, $u_2$, ..., and $u_{N−T+1}$. N−T+1 coordinate pairs $(u_1, g_i(u_1))$, $(u_2, g_i(u_2))$, ..., and $(u_{N−T+1} > g_i(u_{N−T+1}))$ may be obtained by separately substituting the N−T+1 specified constants into x, and $g_i(u_1)$, $g_i(u_2)$, ..., and $g_i(u_{N−T+1})$ are N−T+1 first subsecrets of the service node i.

Similarly, the at least N–T+1 second subsecrets of the service node i are $\varphi_i(x)=B_i+\widehat{q_{i1}} x+\widehat{q_{i2}} x^2+ \ldots +\widehat{q_{iN}} x^N$. i represents the number of the service node i, i=1, 2, . . . , N, $B_i$ represents the second disturbance item of the service node i, $\widehat{q_{i1}}$, $\widehat{q_{i2}}$, . . . , and $\widehat{q_{in}}$ q represent the N second shared keys that are of the service node i and that correspond to the N service nodes, a value of x is any specified constant in the at least N–T+1 specified constants, and $\varphi_i(x)$ represents a second subsecret corresponding to the specified constant taken by x.

For example, there are N–T+1 specified constants, and the N–T+1 specified constants are separately $u_1$, $u_2$, . . . , and $u_{N-T+1}$. N–T+1 coordinate pairs $(u_1, \varphi_i(u_1))$, $(u_2, \varphi_i(u_2))$, . . . , and $(u_{N-T+1}, \varphi_i(u_{N-T+1}))$ may be obtained by separately substituting the N–T+1 specified constants into x, and $\varphi_i(u_1)$, $\varphi_i(u_2)$, . . . , and $\varphi_i(u_{N-T+1})$ are N–T+1 second subsecrets of the service node i.

Figure 5:
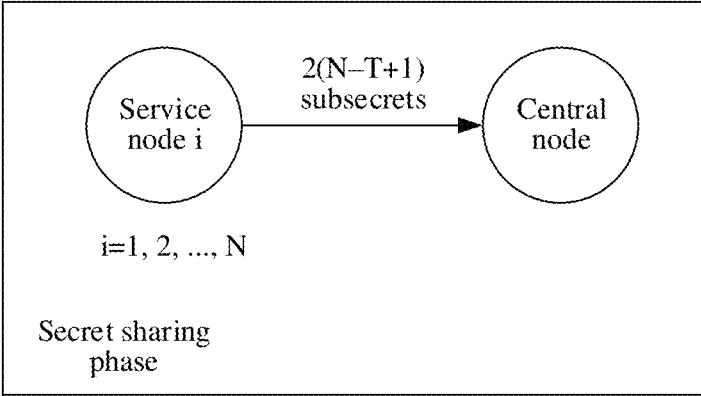
FIG. 5 is a diagram 2 of communication overheads in a secret sharing phase according to an embodiment.

As shown in FIG. 5, in a secret sharing phase, the service node i sends, to the central node, the N–T+1 first subsecrets and the N–T+1 second subsecrets that are obtained by the service node i, that is, a total of 2(N–T+1) subsecrets, and the central node stores the N–T+1 first subsecrets and the N–T+1 second subsecrets that are sent by the service node i until the current round of model training ends.

The central node determines, based on the scrambled models sent by the M online service nodes, an aggregated model in which a disturbance vector exists, where the aggregated model may be represented as $\Sigma_{i\in[N]\backslash D} y_i=\Sigma_{i\in[N]\backslash D} x_i+PRG(\Sigma_{i\in[N]\backslash D} B_i-\Sigma_{i\in D} W_i)$. D represents a set of offline service nodes, for example, numbers of N–M offline service nodes. [N]\D represents a set of online service nodes, for example, numbers of the M online service nodes. The disturbance vector is $PRG(\Sigma_{i\in[N]\backslash D} B_i-\Sigma_{i\in D} W_i)$.

To eliminate scrambling, the central node may send the offline service node information to the at least T service nodes in the M online service nodes. The offline service node information includes information about the N–M offline service nodes in the service node cluster corresponding to the central node, N is greater than or equal to M, M is greater than or equal to T, and T is greater than or equal to 1 and less than or equal to N.

S403: Each of the at least T online service nodes sends a descrambling secret to the central node; and correspondingly, the central node receives the descrambling secrets from the at least T online service nodes.

A descrambling secret of any online service node in the at least T online service nodes is determined based on M first shared keys that are of the online service node and that correspond to the M online service nodes and N–M second shared keys that are of the online service node and that correspond to the N–M offline service nodes.

A descrambling secret of each service node i in the N service nodes may be determined based on a difference between a sum of M first shared keys that are of the service node i and that correspond to the M online service nodes and a sum of N–M second shared keys that are of the service node i and that correspond to the N–M offline service nodes, that is, the descrambling secret of the service node i is $r_i[D]=\Sigma_{j\in[N]\backslash D} \widehat{q_{ij}} -\Sigma_{j\in D} \widehat{s_{ij}}$.

In an example, it is assumed that N is 5, M is 3, N–M=2, N first shared keys that are of the service node i and that correspond to the N service nodes are separately $\widehat{s_{i1}}$, $\widehat{s_{i2}}$, $\widehat{s_{i3}}$, $\widehat{s_{i4}}$, and $\widehat{s_{i5}}$, and N second shared keys that are of the service node i and that correspond to the N service nodes are separately $\widehat{q_{i1}}$, $\widehat{q_{i2}}$, $\widehat{q_{i3}}$, $\widehat{q_{i4}}$, and $\widehat{q_{i5}}$. In this case, if numbers of two offline service nodes are separately 3 and 4, in other words, D includes numbers 3 and 4 of an offline service node 3 and an offline service node 4, the descrambling secret of the service node i is $r_i[D]=(\widehat{s_{i1}} +\widehat{s_{i2}} +\widehat{s_{i5}} )-(\widehat{q_{i3}} +\widehat{q_{i4}} )$.

Figure 6:
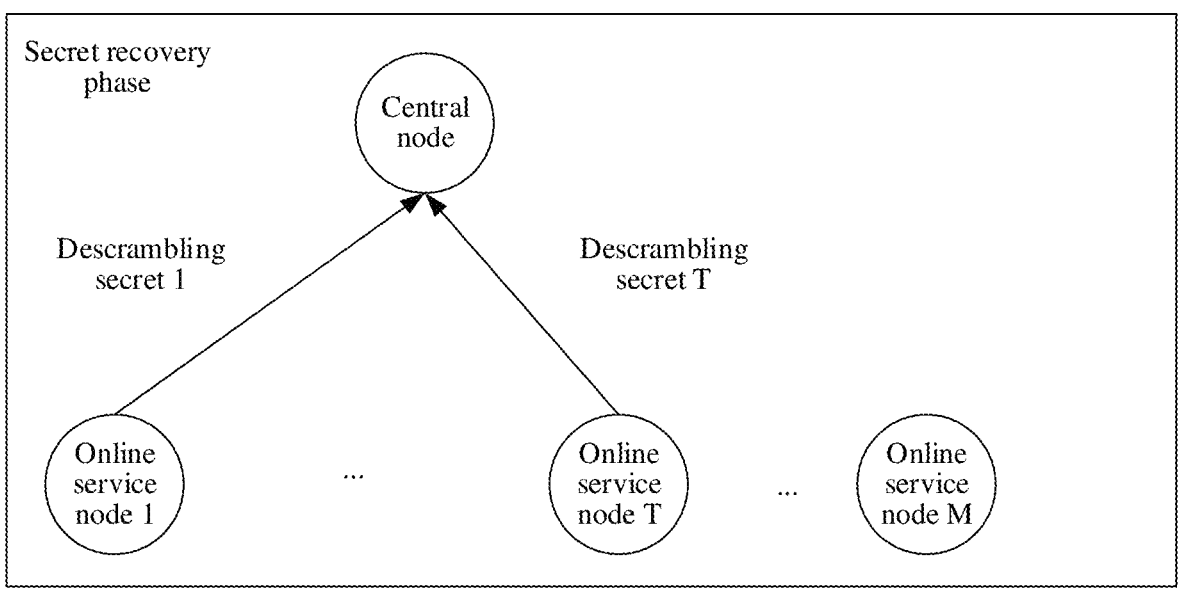
FIG. 6 is a diagram 2 of communication overheads in a secret recovery phase according to an embodiment.

As shown in FIG. 6, in a secret recovery phase, the at least T online service nodes in the M online service nodes may send the determined descrambling secrets to the central node after receiving the offline service node information from the central node.

S404: The central node determines the aggregated model based on the M scrambled models and disturbance vectors of the M scrambled models.

The disturbance vectors are determined based on the descrambling secrets from the at least T online service nodes and at least N–T+1 first subsecrets and at least N–T+1 second subsecrets of each service node in the N service nodes.

For example, the central node may determine, by performing a difference operation on a polynomial $\varphi_i(x)=B_i+\widehat{q_{i1}} x+\widehat{q_{i2}} x^2+ \ldots +\widehat{q_{iN}} x^N$ that corresponds to the M online service nodes and that is used to determine the second subsecret and a polynomial $g_i(x)=W_i+\widehat{s_{i1}} x+\widehat{s_{i2}} x^2+ \ldots + \widehat{s_{iN}} x^N$ that corresponds to the N–M offline service nodes and that is used to determine the first subsecret, a polynomial $(\Sigma_{i\in[N]\backslash D} B_i-\Sigma_{i\in D} W_i)+(\Sigma_{j\in[N]\backslash D} \widehat{q_{1j}} -\Sigma_{j\in D}\widehat{s_{1j}} )x+(\Sigma_{j\in[N]\backslash D} \widehat{q_{2j}} -\Sigma_{j\in D} \widehat{s_{2j}} )x^2+ \ldots +(\Sigma_{j\in[N]\backslash D} \widehat{q_{Nj}} -\Sigma_{j\in D}\widehat{s_{Nj}} )x^N=\Sigma_{i\in[N]\backslash D} \varphi_i(x)-\Sigma_{i\in D} g_i(x)$ used to determine the disturbance vectors of the M scrambled models. D represents the set of offline service nodes, for example, the numbers of the N–M offline service nodes. [N]\D represents the set of online service nodes, for example, the numbers of the M online service nodes.

There are a total of N+1 unknown quantities in the polynomial: $(\Sigma_{i\in[N]\backslash D} B_i-\Sigma_{i\in D} W_i)$ and parameters $(\Sigma_{j\in[N]\backslash D} \widehat{q_{1j}} -\Sigma_{j\in D}\widehat{s_{1j}} )$ $(\Sigma_{j\in[N]\backslash D}\widehat{q_{2j}} -\Sigma_{j\in D}\widehat{s_{2j}} )$, . . . , and $(\Sigma_{j\in[N]\backslash D} \widehat{q_{Nj}} -\Sigma_{j\in D} \widehat{s_{Nj}} )$. At least T unknown quantities in $(\Sigma_{i\in[N]\backslash D} \widehat{q_{1j}} -\Sigma_{j\in D} \widehat{s_{1j}} )$, $(\Sigma_{j\in[N]\backslash D} \widehat{q_{2j}} -\Sigma_{j\in D}\widehat{s_{2j}} )$, . . . , and $(\Sigma_{j\in[N]\backslash D} \widehat{q_{Nj}} -\Sigma_{j\in D}\widehat{s_{Nj}} )$ are the descrambling secrets reported by the at least T online service nodes, in other words, there are still N–T+1 unknown quantities including $(\Sigma_{i\in[N]\backslash D} B_i-\Sigma_{i\in D} W_i)$ in the polynomial.

Each service node in the N service nodes reports at least 2(N–T+1) subsecrets corresponding to the at least N–T+1 specified constants taken by x, so that values of at least N–T+1 pairs of $(x, \Sigma_{i\in[N]\backslash D} \varphi_i(x)-\Sigma_{i\in D} g_i(X))$ may be determined. The values of the at least N–T+1 pairs of $(x, \Sigma_{i\in[N]\backslash D} \varphi_i(x)-\Sigma_{i\in D} g_i(X))$ are substituted into the polynomial $(\Sigma_{i\in[N]\backslash D} B_i-\Sigma_{i\in D} W_i)+(\Sigma_{j\in[N]\backslash D} \widehat{q_{1j}} -\Sigma_{j\in D}\widehat{s_{1j}} )x+(\Sigma_{j\in[N]\backslash D} \widehat{q_{2j}} -\Sigma_{j\in D} \widehat{s_{2j}} )x^2+ \ldots +(\Sigma_{j\in[N]\backslash D} \widehat{q_{Nj}} -\Sigma_{j\in D} \widehat{s_{Nj}} )x^N=\Sigma_{i\in[N]\backslash D} \varphi_i(x)-\Sigma_{i\in D} g_i(X)$ that has the N–T+1 unknown quantities including $(\Sigma_{i\in[N]\backslash D} B_i-\Sigma_{i\in D} W_i)$, so that $(\Sigma_{i\in[N]\backslash D} B_i-\Sigma_{i\in D} W_i)$ may be calculated (for example, through Lagrange interpolation), and then the disturbance vector $PRG(\Sigma_{i\in[N]\backslash D} B_i-\Sigma_{i\in D} W_i)$ is determined.

A disturbance existing in $\Sigma_{i\in[N]\backslash D} y_i=\Sigma_{i\in[N]\backslash D} \widehat{s_{i1}} x_i+PRG(\Sigma_{i\in[N]\backslash D} B_i-\Sigma_{i\in D} W_i)$ can be eliminated based on the disturbance vector $PRG(\Sigma_{i\in[N]\backslash D} B_i-\Sigma_{i\in D} W_i)$, to obtain the aggregated model $\Sigma_{i\in[N]\backslash D} x_i$.

It can be understood with reference to FIG. 5 and FIG. 6 that, in the secure model aggregation method provided in this embodiment, according to the foregoing method, communication overheads of receiving subsecrets by the central node may be reduced to $2N(N-T+1)$, which corresponds to $2(N-T+1)$ subsecrets sent by each service node; and overheads of receiving descrambling secrets may be reduced to T, which corresponds to the descrambling secrets sent by the at least T online service nodes. Compared with FIG. 3 in which communication overheads of uploading subsecrets in the secret sharing phase are $2N^2$, and communication overheads of receiving descrambling secrets in the secret recovery phase are NT, in this method, required signaling or messages are significantly reduced, and therefore signaling overheads are reduced.

In addition, the foregoing uses an example in which the online service node reports a submodel to the central node in each round of training. It may be understood that the submodel may alternatively be replaced with update data of the submodel. The central node may alternatively update a local aggregated model of the central node based on update data of submodels that is reported by online service nodes, to obtain an updated aggregated model.

It may be understood that, to implement the functions in the foregoing embodiment, the central node and the online service node include corresponding hardware structures and/or software modules for performing the functions. A person skilled in the art should easily be aware that, in combination with the units and the method steps in the examples described in embodiments, the embodiments can be implemented by hardware or a combination of hardware and computer software. Whether a function is performed by hardware or hardware driven by computer software depends on particular application scenarios and design constraints of the solutions.

Figure 7:
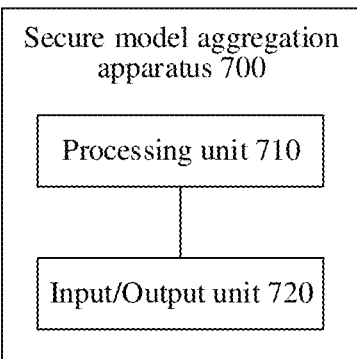
FIG. 7 is a diagram 1 of a communication apparatus according to an embodiment.
Figure 8:
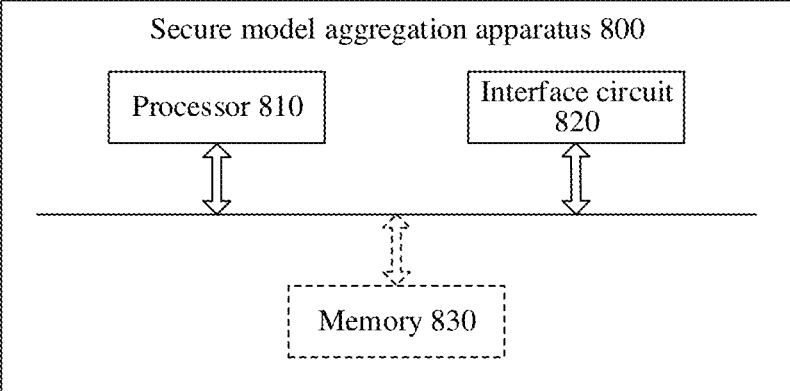
FIG. 8 is a diagram 2 of a communication apparatus according to an embodiment.

FIG. 7 and FIG. 8 are diagrams of structures of possible secure model aggregation apparatuses according to embodiments. These secure model aggregation apparatuses may be configured to implement functions of the central node or the online service node in the method embodiment, and therefore can also implement beneficial effects of the method embodiment.

As shown in FIG. 7, a secure model aggregation apparatus 700 includes a processing unit 710 and an input/output unit 720. The input/output unit 720 may alternatively be a transceiver unit, an interface unit, or an input/output interface. The secure model aggregation apparatus 700 may be configured to implement functions of the central node or the online service node in the method embodiment shown in FIG. 4.

When the secure model aggregation apparatus 700 is configured to implement functions of the central node in the method embodiment shown in FIG. 4:

The input/output unit 720 is configured to receive M scrambled models from M online service nodes, where a scrambled model of any online service node in the M online service nodes is determined by scrambling a submodel of the service node based on a first disturbance item and a second disturbance item that correspond to the online service node. The input/output unit 720 is further configured to: send offline service node information to at least T online service nodes in the M online service nodes, where the offline service node information includes information about N−M offline service nodes in a service node cluster corresponding to the central node, the service node cluster includes N service nodes, N is greater than or equal to M, M is greater than or equal to T, and T is greater than or equal to 1 and less than or equal to N; and receive descrambling secrets from the at least T online service nodes, where a descrambling secret of any online service node in the at least T online service nodes is determined based on M first shared keys that are of the online service node and that correspond to the M online service nodes and N−M second shared keys that are of the online service node and that correspond to the N−M offline service nodes.

The processing unit 710 is configured to determine an aggregated model based on the M scrambled models and disturbance vectors of the M scrambled models, where the disturbance vectors are determined based on the descrambling secrets from the at least T online service nodes and at least N−T+1 first subsecrets and at least N−T+1 second subsecrets of each service node in the N service nodes, at least N−T+1 first subsecrets of any service node in the N service nodes are determined based on a first disturbance item of the service node, N first shared keys that are of the service node and that correspond to the N service nodes, and at least N−T+1 specified constants, and at least N−T+1 second subsecrets are determined based on a second disturbance item of the service node, N second shared keys that are of the service node and that correspond to the N service nodes, and the at least N−T+1 specified constants.

In a possible implementation, the input/output unit 720 is further configured to receive the at least N−T+1 first subsecrets and the at least N−T+1 second subsecrets from the any service node in the N service nodes.

In a possible implementation, the scrambled model of the any online service node in the M online service nodes is determined based on a sum of the submodel of the online service node and a scrambling random number, and the scrambling random number is obtained by performing a random number generation operation on a sum of the first disturbance item and the second disturbance item of the online service node by using a specified random number generation algorithm.

Optionally, the specified random number generation algorithm satisfies that a sum of a first sub scrambling random number obtained by performing a random number generation operation on the first disturbance item and a second sub scrambling random number obtained by performing a random number generation operation on the second disturbance item is equal to the scrambling random number obtained by performing the random number generation operation on the sum of the first disturbance item and the second disturbance item.

In a possible implementation, the at least N−T+1 first subsecrets of the any service node in the N service nodes are $g_i(x)=W_i+\widehat{s_{i1}}x+\widehat{s_{i2}}x^2+\ldots+\widehat{s_{iN}}x^N$, i represents a $\widehat{s_{i2}}$ number of the service node, $i=1, 2, \ldots, N$, $W_i$ represents the first disturbance item of the service node, $\widehat{s_{i1}}$, $\widehat{s_{i2}}$, $\ldots$, and $\widehat{s_{iN}}$ represent the N first shared keys that are of the service node and that correspond to the N service nodes, a value of x is any specified constant in the at least N−T+1 specified constants, and $g_i(x)$ represents a first subsecret corresponding to the specified constant taken by x; and the at least N−T+1 second subsecrets of the any service node in the N service nodes are $\varphi_i(x)=B_i+\widehat{q_{i1}}x+\widehat{q_{i2}}x^2+\ldots+\widehat{q_{iN}}x^N$, i represents the number of the service node, $i=1, 2, \ldots, N$, $B_i$ represents the second disturbance item of the service node, $\widehat{q_{i1}}$, $\widehat{q_{i2}}$, $\ldots$, and $\widehat{q_{in}}$ represent the N second shared keys that are of the service node and that correspond to the N service nodes, a value of x is any specified constant in the at least N−T+1 specified constants, and $y_i(x)$ represents a second subsecret corresponding to the specified constant taken by x.

In a possible implementation, the N first shared keys that are of the any service node in the N service nodes and that correspond to the N service nodes are determined based on N shared keys that are of the service node and that correspond to the N service nodes and a first time parameter; and the N second shared keys that are of the any service node in the N service nodes and that correspond to the N service nodes are determined based on the N shared keys that are of the service node and that correspond to the N service nodes and a second time parameter.

In a possible implementation, the first disturbance item $W_i$ of the any service node in the N service nodes is equal to $\Sigma_{i<j} s_{ij} - \Sigma_{i>j} s_{ji}$, i represents the number of the service node, j=1, 2, ..., N, and $s_{ij}$ or $s_{ji}$ represents a shared key of the service node with the number i and a service node with a number j.

When the secure model aggregation apparatus 700 is configured to implement functions of the online service node in the method embodiment shown in FIG. 4:

The input/output unit 720 is configured to: send a scrambled model to a central node, where the scrambled model is determined by scrambling a submodel of the online service node based on a first disturbance item and a second disturbance item that correspond to the online service node; and receive offline service node information from the central node, where the offline node information includes information about N−M offline service nodes in a service node cluster corresponding to the central node, the service node cluster includes N service nodes, the N service nodes include the online service node, and N is greater than or equal to M.

The processing unit 710 is configured to determine a descrambling secret based on M first shared keys that are of the online service node and that correspond to M online service nodes in the service node cluster and N−M second shared keys that are of the online service node and that correspond to the N−M offline service nodes.

The input/output unit 720 is further configured to send the descrambling secret to the central node.

In a possible implementation, the input/output unit 720 is further configured to send at least N−T+1 first subsecrets and at least N−T+1 second subsecrets to the central node, where T is greater than or equal to 1 and is less than or equal to N. The at least N−T+1 first subsecrets are determined based on the first disturbance item, N first shared keys that are of the online service node and that correspond to the N service nodes, and at least N−T+1 specified constants, and the at least N−T+1 second subsecrets are determined based on the second disturbance item, N second shared keys that are of the online service node and that correspond to the N service nodes, and the at least N−T+1 specified constants.

In a possible implementation, the scrambled model is determined based on a sum of the submodel and a scrambling random number, and the scrambling random number is obtained by performing a random number generation operation on a sum of the first disturbance item and the second disturbance item by using a specified random number generation algorithm.

Optionally, the specified random number generation algorithm satisfies that a sum of a first sub scrambling random number obtained by performing a random number generation operation on the first disturbance item and a second sub scrambling random number obtained by performing a random number generation operation on the second disturbance item is equal to the scrambling random number obtained by performing the random number generation operation on the sum of the first disturbance item and the second disturbance item.

In a possible implementation, the at least N−T+1 first subsecrets are $g_i(x) = W_i + \widehat{s_{i1}} x + \widehat{s_{i2}} x^2 + \ldots + \widehat{s_{iN}} x^N$, i represents a number of the online service node, i=1, 2, ..., N, $W_i$ represents the first disturbance item, $\widehat{s_{i1}}, \widehat{s_{i2}}, \ldots,$ and $\widehat{s_{iN}}$ represent the N first shared keys that are of the online service node and that correspond to the N service nodes, a value of x is any specified constant in the at least N−T+1 specified constants, and $g_i(x)$ represents a first subsecret corresponding to the specified constant taken by x; and the at least N−T+1 second subsecrets are $\varphi_i(x) = B_i + \widehat{q_{i1}} x + \widehat{q_{i2}} x^2 + \ldots + \widehat{q_{iN}} x^N$, i represents the number of the online service node, i=1, 2, ..., N, $B_i$ represents the second disturbance item, $\widehat{q_{i1}}, \widehat{q_{i2}}, \ldots,$ and $\widehat{q_{in}}$ represent the N second shared keys that are of the online service node and that correspond to the N service nodes, a value of x is any specified constant in the at least N−T+1 specified constants, and $\varphi_i(x)$ represents a second subsecret corresponding to the specified constant taken by x.

In a possible implementation, the N first shared keys that are of the online service node and that correspond to the N service nodes are determined based on N shared keys that are of the online service node and that correspond to the N service nodes and a first time parameter; and the N second shared keys that are of the online service node and that correspond to the N service nodes are determined based on the N shared keys that are of the online service node and that correspond to the N service nodes and a second time parameter.

In a possible implementation, the first disturbance item $W_i$ is equal to $\Sigma_{i<j} s_{ij} - \Sigma_{i>j} s_{ji}$, i represents the number of the online service node, j=1, 2, ..., N, and $s_{ij}$ or $s_{ji}$ represents a shared key of the online service node with the number i and a service node with a number j.

As shown in FIG. 8, a secure model aggregation apparatus 800 includes a processor 810 and an interface circuit 820. The processor 810 and the interface circuit 820 are coupled to each other. It may be understood that the interface circuit 820 may be a transceiver or an input/output interface. Optionally, the secure model aggregation apparatus 800 may further include a memory 830, configured to: store instructions executed by the processor 810, or store input data required for running instructions by the processor 810, or store data generated after the processor 810 runs instructions. Optionally, the memory 830 may alternatively be integrated with the processor 810.

When the secure model aggregation apparatus 800 is configured to implement the method shown in FIG. 4, the processor 810 is configured to implement a function of the processing unit 710, and the interface circuit 820 is configured to implement a function of the input/output unit 720.

It may be understood that, the processor in embodiments may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, the storage medium is coupled to the processor, so that the processor can read information from the storage medium and write information into the storage medium. Further, the storage medium may alternatively be a component of the processor. The processor and the storage medium may be located in an ASIC. In addition, the ASIC may be located in a network device or a terminal device. Also, the processor and the storage medium may alternatively exist as discrete components in a network device or a terminal device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, the procedures or functions in embodiments are completely or partially performed. The computer may be a general-purpose computer, a dedicated computer, a computer network, a network device, user equipment, or another programmable apparatus. The computer programs or instructions may be stored in a non-transitory computer-readable storage medium, or may be transmitted from a non-transitory computer-readable storage medium to another non-transitory computer-readable storage medium. For example, the computer programs or instructions may be transmitted from a website, computer, server, or data center to another website, computer, server, or data center in a wired or wireless manner. The non-transitory computer-readable storage medium may be any usable medium that can be accessed by a computer, or a data storage device, for example, a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive. The non-transitory computer-readable storage medium may be a volatile storage medium or a non-volatile storage medium, or may include both a volatile storage medium and a non-volatile storage medium.

In various embodiments, unless otherwise specified or there is a logic conflict, terms and/or descriptions in different embodiments are consistent and may be mutually referenced, and features in different embodiments may be combined based on an internal logical relationship thereof, to form a new embodiment.

In addition, it should be understood that the term "for example" in embodiments is used to represent giving an example, an illustration, or a description. Any embodiment, implementation, or design scheme described as an "example" should not be explained as being more preferred or having more advantages than another embodiment, implementation, or design scheme. Exactly, the term "example" is used to present a concept in a specific manner.

In addition, in embodiments, terms "information", "signal", "message", and "channel" may be interchangeably used sometimes. It should be noted that meanings expressed by the terms are consistent when differences of the terms are not emphasized. Terms "of", "corresponding (or relevant)", and "corresponding" may be interchangeably used sometimes. It should be noted that meanings expressed by the terms are consistent when differences of the terms are not emphasized.

It may be understood that various numbers in embodiments are merely used for differentiation for ease of description, and are not used to limit the scope of embodiments. Sequence numbers of the foregoing processes do not mean execution sequences. The execution sequences of the processes should be determined based on functions and internal logic of the processes.

The invention claimed is:

1. A method, applicable for a central node, comprising:
   receiving M scrambled models from M online service nodes, wherein a scrambled model of any online service node in the M online service nodes is determined by scrambling a submodel of the any service node based on a first disturbance item and a second disturbance item that correspond to the any online service node;
   sending offline service node information to at least T online service nodes in the M online service nodes, wherein the offline service node information comprises information about N-M offline service nodes in a service node cluster corresponding to the central node, the service node cluster comprises N service nodes, N is greater than or equal to M, M is greater than or equal to T, and T is greater than or equal to 1 and less than or equal to N;
   receiving descrambling secrets from the at least T online service nodes, wherein a descrambling secret of any online service node in the at least T online service nodes is determined based on M first shared keys of the any online service node that correspond to the M online service nodes and N-M second shared keys of the any online service node that correspond to the N-M offline service nodes;
   determining an aggregated model based on the M scrambled models and disturbance vectors of the M scrambled models, wherein the disturbance vectors are determined based on the descrambling secrets from the at least T online service nodes and at least N−T+1 first subsecrets and at least N−T+1 second subsecrets of each service node in the N service nodes;
   determining at least N−T+1 first subsecrets of any service node in the N service nodes based on a first disturbance item of the any service node, N first shared keys of the any service node that correspond to the N service nodes, and at least N−T+1 specified constants; and
   determining at least N−T+1 second subsecrets based on a second disturbance item of the any service node, N second shared keys of the any service node that correspond to the N service nodes, and the at least N−T+1 specified constants.

2. The method according to claim 1, further comprising:
   receiving the at least N−T+1 first subsecrets and the at least N−T+1 second subsecrets from the any service node in the N service nodes.

3. The method according to claim 1, further comprising:
   determining the scrambled model of the any online service node in the M online service nodes based on a sum of the submodel of the any online service node and a scrambling random number; and
   obtaining the scrambling random number by performing a random number generation operation on a sum of the first disturbance item and the second disturbance item of the any online service node by using a specified random number generation algorithm.

4. The method according to claim 3, wherein the specified random number generation algorithm satisfies a sum of a first sub scrambling random number obtained by performing a random number generation operation on the first disturbance item and a second sub scrambling random number obtained by performing a random number generation operation on the second disturbance item that is equal to the scrambling random number obtained by performing the random number generation operation on the sum of the first disturbance item and the second disturbance item.

5. The method according to claim 1, further comprising:

determining the N first shared keys of the any service node in the N service nodes that correspond to the N service nodes based on N shared keys of the any service node that correspond to the N service nodes and a first time parameter; and determining the N second shared keys of the any service node in the N service nodes that correspond to the N service nodes based on the N shared keys of the any service node that correspond to the N service nodes and a second time parameter.

6. A method, applicable for an online service node, comprising:

sending a scrambled model to a central node, wherein the scrambled model is determined by scrambling a submodel of the online service node based on a first disturbance item and a second disturbance item that correspond to the online service node;

receiving offline service node information from the central node, wherein the offline node information comprises information about N-M offline service nodes in a service node cluster corresponding to the central node, the service node cluster comprises N service nodes, the N service nodes comprise the online service node, and N is greater than or equal to M; and sending a descrambling secret to the central node, wherein the descrambling secret is determined based on M first shared keys of the online service node that correspond to M online service nodes in the service node cluster and N-M second shared keys of the online service node that correspond to the N-M offline service nodes.

7. The method according to claim 6, further comprising:

sending at least N-T+1 first subsecrets and at least N-T+1 second subsecrets to the central node, wherein T is greater than or equal to 1 and is less than or equal to N;

determining the at least N-T+1 first subsecrets based on the first disturbance item, N first shared keys of the online service node that correspond to the N service nodes, and at least N-T+1 specified constants; and determining the at least N-T+1 second subsecrets based on the second disturbance item, N second shared keys of the online service node that correspond to the N service nodes, and the at least N-T+1 specified constants.

8. The method according to claim 7, further comprising:

determining the scrambled model based on a sum of the submodel and a scrambling random number; and obtaining the scrambling random number by performing a random number generation operation on a sum of the first disturbance item and the second disturbance item by using a specified random number generation algorithm.

9. The method according to claim 8, wherein the specified random number generation algorithm satisfies a sum of a first sub scrambling random number obtained by performing a random number generation operation on the first disturbance item and a second sub scrambling random number obtained by performing a random number generation operation on the second disturbance item that is equal to the scrambling random number obtained by performing the random number generation operation on the sum of the first disturbance item and the second disturbance item.

10. The method according to claim 6, wherein the N first shared keys of the online service node that correspond to the N service nodes are determined based on N shared keys of the online service node that correspond to the N service nodes and a first time parameter; and the N second shared keys of the online service node that correspond to the N service nodes are determined based on the N shared keys of the online service node that correspond to the N service nodes and a second time parameter.

11. An apparatus, used in a central node, and comprising a processor coupled to a memory storing instructions, which, when executed by the processor, cause the apparatus to:

receive M scrambled models from M online service nodes, wherein a scrambled model of any online service node in the M online service nodes is determined by scrambling a submodel of the any service node based on a first disturbance item and a second disturbance item that correspond to the any online service node;

send offline service node information to at least T online service nodes in the M online service nodes, wherein the offline service node information comprises information about N-M offline service nodes in a service node cluster corresponding to the apparatus, the service node cluster comprises N service nodes, N is greater than or equal to M, M is greater than or equal to T, and T is greater than or equal to 1 and less than or equal to N;

receive descrambling secrets from the at least T online service nodes, wherein a descrambling secret of any online service node in the at least T online service nodes is determined based on M first shared keys of the any online service node that correspond to the M online service nodes and N-M second shared keys of the any online service node that correspond to the N-M offline service nodes; and determine an aggregated model based on the M scrambled models and disturbance vectors of the M scrambled models, wherein the disturbance vectors are determined based on the descrambling secrets from the at least T online service nodes and at least N-T+1 first subsecrets and at least N-T+1 second subsecrets of each service node in the N service nodes, at least N-T+1 first subsecrets of any service node in the N service nodes are determined based on a first disturbance item of the any service node, N first shared keys of the any service node that correspond to the N service nodes, and at least N-T+1 specified constants, and at least N-T+1 second subsecrets are determined based on a second disturbance item of the any service node, N second shared keys of the any service node that correspond to the N service nodes, and the at least N-T+1 specified constants.

12. The apparatus according to claim 11, wherein the instructions are further executed by the processor to cause the apparatus to:

receive the at least N-T+1 first subsecrets and the at least N-T+1 second subsecrets from the any service node in the N service nodes.

13. The apparatus according to claim 11, wherein the scrambled model of the any online service node in the M online service nodes is determined based on a sum of the submodel of the any online service node and a scrambling random number, and the scrambling random number is obtained by performing a random number generation operation on a sum of the first disturbance item and the second disturbance item of the any online service node by using a specified random number generation algorithm.

14. The apparatus according to claim 13, wherein the specified random number generation algorithm satisfies that a sum of a first sub scrambling random number obtained by performing a random number generation operation on the first disturbance item and a second sub scrambling random number obtained by performing a random number generation operation on the second disturbance item that is equal to the scrambling random number obtained by performing the random number generation operation on the sum of the first disturbance item and the second disturbance item.

15. The apparatus according to claim 11, wherein the N first shared keys of the any service node in the N service nodes that correspond to the N service nodes are determined based on N shared keys of the any service node that correspond to the N service nodes and a first time parameter; and the N second shared keys of the any service node in the N service nodes that correspond to the N service nodes are determined based on the N shared keys of the any service node that correspond to the N service nodes and a second time parameter.

16. An apparatus, used in an online service node, and comprising a processor coupled to a memory storing instructions, which, when executed by the processor, cause the apparatus to:

send a scrambled model to a central node, wherein the scrambled model is determined by scrambling a submodel of the online service node based on a first disturbance item and a second disturbance item that correspond to the online service node;

receive offline service node information from the central node, wherein the offline node information comprises information about N-M offline service nodes in a service node cluster corresponding to the central node, the service node cluster comprises N service nodes, the N service nodes comprise the online service node, and N is greater than or equal to M; and send a descrambling secret to the central node, wherein the descrambling secret is determined based on M first shared keys of the online service node that correspond to M online service nodes in the service node cluster and N-M second shared keys of the online service node that correspond to the N-M offline service nodes.

17. The apparatus according to claim 16, wherein the instructions are further executed by the processor to cause the apparatus to:

send at least N−T+1 first subsecrets and at least N−T+1 second subsecrets to the central node, wherein T is greater than or equal to 1 and is less than or equal to N; and the at least N−T+1 first subsecrets are determined based on the first disturbance item, N first shared keys of the online service node that correspond to the N service nodes, and at least N−T+1 specified constants, and the at least N−T+1 second subsecrets are determined based on the second disturbance item, N second shared keys of the online service node that correspond to the N service nodes, and the at least N−T+1 specified constants.

18. The apparatus according to claim 17, wherein the scrambled model is determined based on a sum of the submodel and a scrambling random number, and the scrambling random number is obtained by performing a random number generation operation on a sum of the first disturbance item and the second disturbance item by using a specified random number generation algorithm.

19. The apparatus according to claim 18, wherein the specified random number generation algorithm satisfies a sum of a first sub scrambling random number obtained by performing a random number generation operation on the first disturbance item and a second sub scrambling random number obtained by performing a random number generation operation on the second disturbance item that is equal to the scrambling random number obtained by performing the random number generation operation on the sum of the first disturbance item and the second disturbance item.

20. The apparatus according to claim 16, wherein the N first shared keys of the online service node that correspond to the N service nodes are determined based on N shared keys of the online service node that correspond to the N service nodes and a first time parameter; and the N second shared keys of the online service node that correspond to the N service nodes are determined based on the N shared keys of the online service node that correspond to the N service nodes and a second time parameter.

* * * * *